United States Patent [19]

Boden et al.

[11] Patent Number: 5,894,639
[45] Date of Patent: Apr. 20, 1999

[54] CORD LOCK APPARATUS

[75] Inventors: Robert O. Boden, 1580 Gaywood Dr., Altadena, Calif. 91001; Kurt H. Lundstedt, Hawthorn Wood, Ill.

[73] Assignee: Robert O. Boden, Altadena, Calif.

[21] Appl. No.: 09/044,477

[22] Filed: Mar. 19, 1998

[51] Int. Cl.$^6$ ..................................... F16G 11/04
[52] U.S. Cl. .................. 24/115 G; 24/712.5; 24/136 R; 24/115 M
[58] Field of Search .................. 24/115 G, 115 H, 24/115 M, 115 R, 136 A, 136 R, 712.5, 163 R; 403/211, 390

[56] References Cited

U.S. PATENT DOCUMENTS

| | | |
|---|---|---|
| 2,200,895 | 5/1940 | Rio .................................. 24/712.5 |
| 3,132,390 | 5/1964 | Boden ............................ 24/712.5 X |
| 3,845,575 | 11/1974 | Boden ........................... 24/115 M X |
| 4,035,877 | 7/1977 | Brownson et al. . |
| 4,156,574 | 5/1979 | Boden .................................. 403/211 |
| 4,665,590 | 5/1987 | Udelhofen et al. ............... 24/136 R X |
| 4,794,673 | 1/1989 | Yamaguchi ......................... 24/115 G |
| 4,878,269 | 11/1989 | Anscher et al. .................... 24/115 G |
| 5,435,044 | 7/1995 | Ida ................................. 24/115 M X |
| 5,454,140 | 10/1995 | Murai . |
| 5,572,770 | 11/1996 | Boden ............................ 24/712.5 X |
| 5,671,505 | 9/1997 | Anscher ............................. 24/115 G |
| 5,737,808 | 4/1998 | Ikeda ................................. 24/115 G |

*Primary Examiner*—Anthony Knight
*Assistant Examiner*—Robert J. Sandy
*Attorney, Agent, or Firm*—Darby & Darby, P.C.

[57] ABSTRACT

A cord lock apparatus includes an open-ended cage and a slide slidably received at least partially in the cage and movable relative to the cage between a cord locking position and an intermediate position. The slide includes travel limiting structure to engage the cage at the intermediate position, a slide body, and a tension spring mechanism to allow the slide body to be displaced to a cord releasing position while urging the slide body toward the cord locking position.

23 Claims, 4 Drawing Sheets

1
CORD LOCK APPARATUS

BACKGROUND OF THE INVENTION

1. Field of the Invention

The present invention relates to cord fasteners for releasably engaging one or more cord segments to prevent movement of the cord segments relative to the fastener. More particularly, the invention relates to such cord fasteners that include spring mechanisms to urge the fastener toward a locking position.

2. Description of the Prior Art

Cord fasteners are used in many different applications to releasably retain one or more cord segments or drawstrings in a tightened condition and to release such cord segments when desired. For example, cord fasteners are used in connection with garments that include drawstrings, such as hooded jackets and sweatshirts. Such fasteners are also used on various types of bags such as laundry bags and other storage bags that utilize cords to temporarily close an open end thereof. These cord fasteners vary in size depending on the particular application, from less than one inch long to several inches or more.

A number of different cord fastener designs have been proposed by those skilled in the art. One such cord fastener device is disclosed in U.S. Pat. No. 4,156,574 and includes a cage that slidably receives a locking slide therein. The slide includes a pair of resilient, flexible feeler arms that extend laterally outwardly from the opposite sides of the slide body to engage the respective cord segments when those segments are extended through the cage. Thus, the feeler arms are continually in engagement with the cord segments as the cord segments are moved relative to the cage. Although this structure has proven to work extremely well in drawing the slide body toward its locking position, over time the continual passing of the cord segments over the feeler arms can cause the cord to fray, resulting in a shortened useful life of the cord.

Yet another prior art cord fastener, disclosed in U.S. Pat. No. 4,878,269, comprises a housing and a locking element, the locking element including a stationary segment fixedly connected to the housing and a movable segment displaceable relative to the housing. The stationary and movable segments are interconnected by means of a compression spring interposed therebetween. The compression spring continually urges the movable segment away from the stationary segment and into a cord locking position. The compression spring is continually in a state of compression, which can result in premature failure of the spring. Furthermore, it has been found that by utilizing a compression spring to continually urge the movable segment into the cord locking position, the device can be somewhat difficult to unlock, even under moderately heavy load conditions.

Still another prior art cord locking device is disclosed in U.S. Pat. No. 5,572,770, invented by an inventor of the subject matter of the present application. The device disclosed therein includes a cage and slide, with the slide having an integrally formed, outwardly protruding leaf spring to urge the slide into position. While this device is generally satisfactory, it does not provide a relatively low profiled cord lock apparatus, and is therefore undesirable for use in applications requiring such a device.

Accordingly, it will be apparent to those skilled in the art that there continues to be a need for a cord locking apparatus that is of a construction providing a relatively long useful life, that is relatively easy to manipulate between cord locking and cord releasing positions, and that incorporates an unexposed spring mechanism to provide a relatively low profile. Furthermore, there exists a need for a cord locking device that accommodates different sizes of cord segments. The present invention addresses these needs and others.

SUMMARY OF THE INVENTION

Briefly, and in general terms, the present invention provides a self-locking cord lock apparatus that has a relatively long useful life, will not prematurely wear out the cords, and accommodates cords of various diameters. The cord lock apparatus comprises a cage defining a through passageway and a slide contained in the cage and freely movable relative to the cage between a cord locking position and an intermediate position. An unexposed tension spring is provided to urge the slide toward the cord locking position when the slide body is disposed at a cord releasing position.

Thus, the cord lock apparatus of the present invention in one preferred embodiment comprises: a cage formed with a through passage in which at least one cord may pass; a slide at least partially contained in the cage and including a slide body displaceable between a cord locking position to lock the cord in place and prevent relative movement of the cord and a cord releasing position to permit such relative movement, the slide being freely movable relative to the cage between the cord locking position and an intermediate position between the cord releasing and cord locking positions; the slide further including a spring device to urge the slide body toward the cord locking position when the slide body is in the cord releasing position.

In another embodiment, the cord locking apparatus of the present invention includes a similar cage formed with a longitudinally extending notch disposed at one end thereof. Travel limiting structure in the form of a stop is provided on the slide and is received in the notch to allow the slide to move freely between the cord locking and intermediate positions.

In still another embodiment, the cage is formed with a longitudinal slot, and the slide includes an upstanding rib slidably received in the slot, such that the slot and rib cooperate to limit the range of travel of the slide body relative to the cage.

Other features and advantages of the present invention will become apparent from the following detailed description, taken in conjunction with the accompanying drawings which illustrate, by way of example, the features of the present invention.

DETAILED DESCRIPTION OF THE PREFERRED EMBODIMENT

Figures 1, 2:
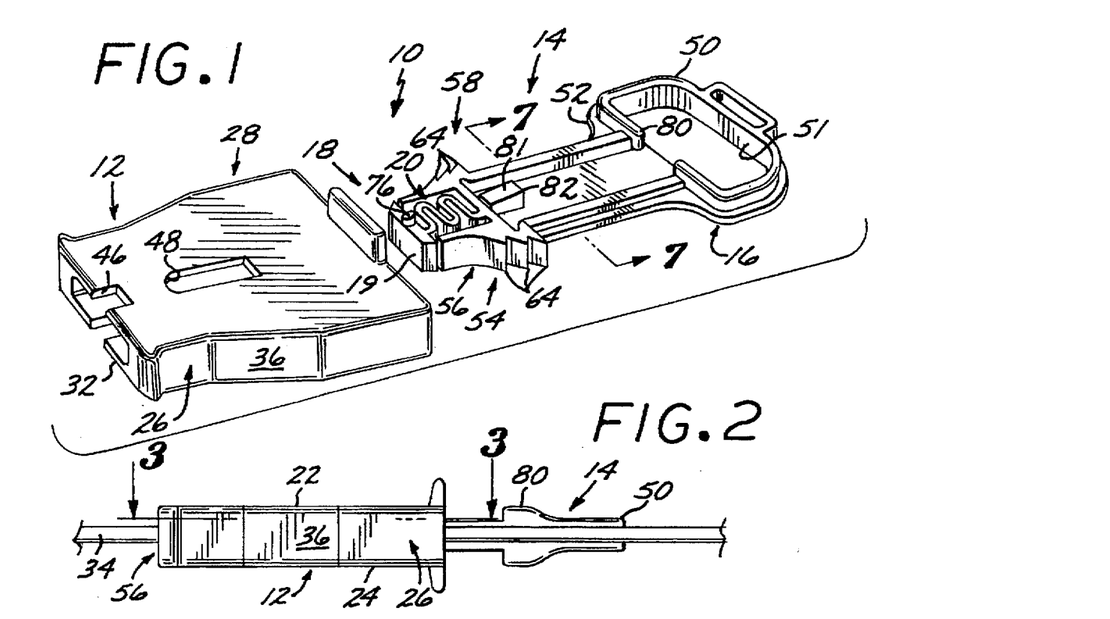
FIG. 1 is an exploded perspective view of a cord lock apparatus constructed according to one embodiment of the present invention.
FIG. 2 is a side view of the cord lock apparatus of FIG. 1 in an assembled configuration and engaged with a pair of cord segments.
Figure 3:
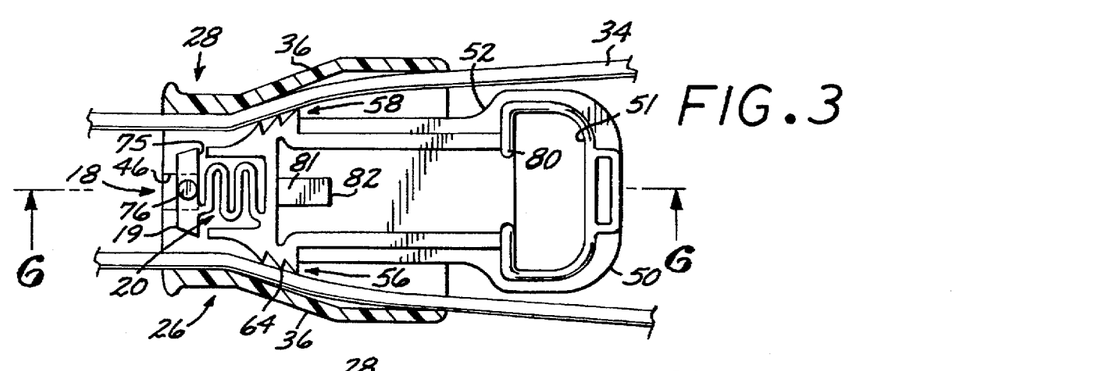
FIG. 3 is a cross-sectional view taken along line 3—3 of FIG. 2 and showing the assembled cord lock apparatus in an intermediate position.
Figure 4:
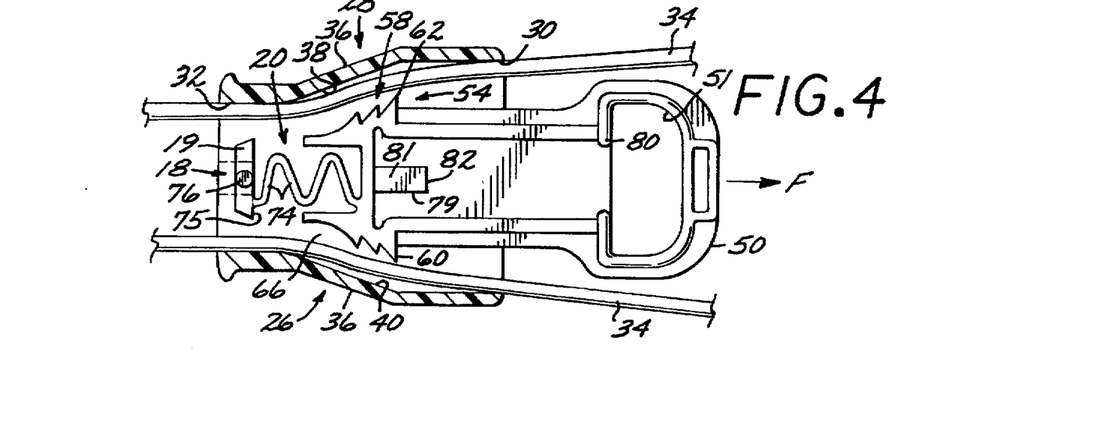
FIG. 4 is a cross-sectional view similar to FIG. 3 but showing the cord lock apparatus in a cord releasing position.

In the following detailed description, like reference numerals will be used to refer to like or corresponding elements in the different figures of the drawings. Referring now to the drawings, and particularly to FIGS. 1, 3, and 4, there is shown, generally, a cord lock apparatus 10 comprising one preferred embodiment of the present invention. The cord lock apparatus comprises, generally, an open-ended cage 12 and a slide 14 including a slide body 16. The cage defines an interior chamber open at its opposite longitudinal ends for slidably containing at least a portion of the slide therein. The slide is floatably contained in the cage to be freely movable relative to the cage between a cord locking position (FIG. 5) and an intermediate position (FIG. 3) as described in greater detail below. The phrase "freely movable" is intended to mean that the movement of the slide between the cord locking and intermediate positions is unrestrained by the cage (i.e., the slide "floats" in the cage between the cord locking and intermediate positions), and that the movement is only restrained by engagement with the cord segments. The slide further includes travel limiting structure, generally designated 18, disposed adjacent one end 19 of the slide that cooperates with the cage to resist further movement of the one end toward a cord releasing position (FIG. 4) when the slide is disposed at the intermediate position. The slide still further includes a spring mechanism, generally designated 20, interposed between the one end 19 and the slide body and interconnecting the two together. The spring mechanism may be tensioned to allow the slide body to be displaced to the cord releasing position (FIG. 4) while simultaneously urging the slide body back toward the cord locking position.

Referring to FIGS. 1 and 4, the cage 12 includes substantially planar front and rear walls 22 and 24, and a pair of side walls, generally designated 26 and 28. The cage further includes an open first end 30 and an open second end 32 formed with a cross-sectional opening smaller than that of the first end. The cage defines an interior cord passageway extending from the first end to the second end for extension therethrough of one or more cord segments 34 (FIGS. 3 and 4). The cage further includes an intermediate tapered cage segment 36 interposed between the first and second ends and comprising a pair of opposing inner surfaces 38 and 40 that define cord tracks or channels in which the respective cord segments may ride while passing through the cage. The inner surfaces are preferably formed with a semi-circular cross-sectional shape (not shown) to complement the shape of the cord segments.

The cage 12 is still further formed at the second end with a centrally disposed notch 46 (FIGS. 1 and 3) formed in the front wall 22 to allow for free movement of the slide 14 relative to the cage as described in greater detail below. It will be understood that the front wall could alternatively be formed with a channel on the inner surface of the front wall that does not extend through to the outer surface of the front wall. The front wall additionally has formed therein a longitudinal slot 48 that likewise cooperates with the slide to limit relative movement therebetween as described in more detail below. The inner surface of the front wall is still further formed centrally at the first end 30 with a sloped guideway 49 (FIG. 6) to assist in assembling the slide and cage together as described in greater detail below.

The cage 12 is preferably formed of a hard, resilient and lightweight material such as a plastic resin, for example polypropylene, nylon, or DELRIN™ available from DuPont Corporation, and is typically manufactured by means of injection molding techniques well known to those skilled in the art.

Figures 5, 6, 7, 8, 9:
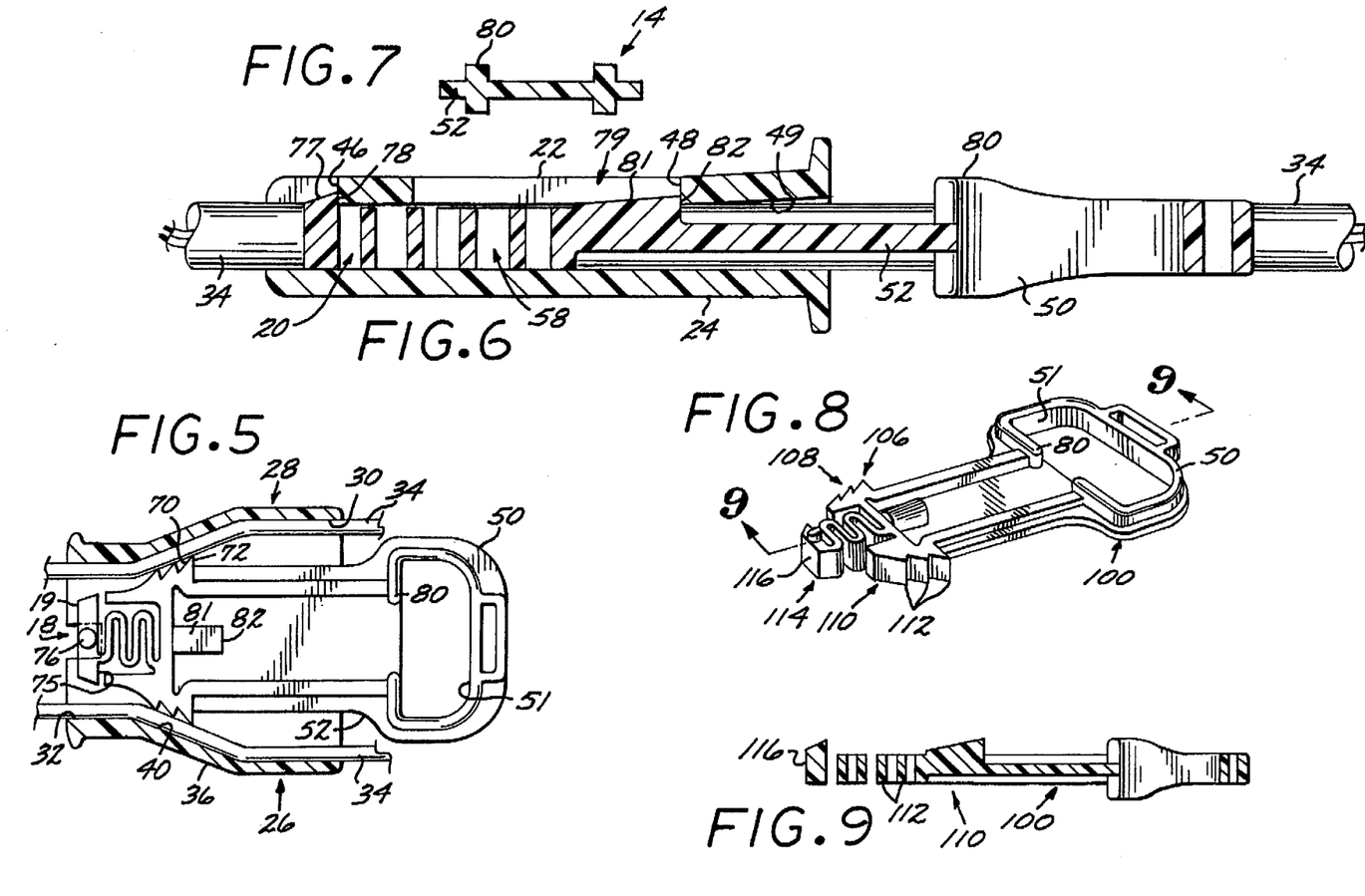
FIG. 5 is a cross-sectional view similar to FIG. 4 but showing the cord lock apparatus in a cord locking position.
FIG. 6 is a cross-sectional view, in enlarged scale, taken along the line 6—6 of FIG. 3.
FIG. 7 is a cross-sectional view, in enlarged scale, taken along the line 7—7 of FIG. 1.
FIG. 8 is a perspective view of a slide incorporated in a second preferred embodiment of the cord lock apparatus of the present invention.
FIG. 9 is a cross-sectional view taken along the line 9—9 of FIG. 8.

Referring to FIGS. 1 and 4, there is shown the slide 14 including the slide body 16, the spring mechanism 20, and the travel limiting structure 18 disposed on the one end 19. The slide body includes a first end in the form of a generally elliptical ring 50 defining a handle and including a central opening 51 dimensioned for receipt of a person's finger therein for manipulating the slide body. The slide body includes a tapered intermediate segment 52 extending from the handle and that connects with a cord engaging structure, generally designated 54, which is contained within the cage 12 when the slide and cage are assembled together. In a preferred embodiment, the cord engaging structure comprises a pair of laterally projecting cord gripping segments, generally designated 56 and 58, including angled outer edges 60 and 62, each of which is formed with a plurality of serrations or teeth 64. The teeth of each cord gripping segment include tips that lie in respective common planes that are substantially parallel to the inner surfaces 38 and 40. The cord gripping segments are formed on the slide body at predetermined locations to oppose the respective inner surfaces 38 and 40 as the slide body is moved from the cord locking to the cord releasing positions (FIGS. 4 and 5). The cord gripping segments and inner surfaces cooperate to define therebetween a pair of converging cord segment paths 66 and 68. It will be understood that the cross-sectional dimensions of the cord paths will vary depending on the relative positions of the slide body and cage. Accordingly, the cord lock apparatus of the present invention can either lock the cord segments in place or release the cord segments depending on those relative positions.

The teeth 64 are formed with respective ramped first edges 70 and stepped second edges 72 to permit the cord segments to travel freely in an outward direction (to the right as shown in FIG. 5) across the ramped first edges. However, movement of the cord segments in an inward direction (to the left as shown in FIG. 5) causes one or more of the stepped second edges of the teeth to engage the respective cord segments, thereby drawing the slide body 16 inwardly relative to the cage 12 from the intermediate position (FIG. 3) into the cord locking position (FIG. 5) such that the teeth and respective inner surfaces 38 and 40 cooperate to confine and compress the cord segments therebetween to lock the cord segments in place. This occurs because the teeth are in relatively loose frictional engagement with the cord segments even when the slide body is in its intermediate position, causing the slide body to be drawn toward the cord locking position with ever-increasing force as the cord segments are pulled in the inward direction.

The slide 14 further includes the integrally molded spring mechanism 20 extending longitudinally from the second end of the slide body 16. In one embodiment, the spring mechanism comprises a plurality of flexible, resilient arms 74 connected together in a switchback or zig-zag configuration. It will be understood that many other types of spring mechanisms may alternatively be used, for example coil springs and the like.

Mounted on the bottom arm 74 of the spring mechanism 20 is the travel limiting structure 18. In one preferred embodiment, the travel limiting structure is embodied in the form of an upstanding peg or stop 76 located generally centrally on the bottom arm. The stop includes a ramped leading edge 77 and a stepped trailing edge 78 (FIG. 6) and is formed at a preselected location on the slide such that when the slide 14 and cage 12 are assembled together, the stop is disposed within the notch 46 for free movement there within (FIGS. 3 and 5). Thus it will be understood that the stop and notch cooperate to define the range of free movement of the slide 14 relative to the cage 12.

The one end 19 of the slide 14 is formed having a relatively long length to define a pair of laterally spaced apart shoulders 75 directly beneath the bottom ends of the respective cord gripping segments 56 and 58. As described in greater detail below, during assembly of the cord lock apparatus 10, the shoulders and cord gripping segments cooperate to minimize compression of the spring mechanism 20.

The slide body 16 further has formed thereon a longitudinally extending, upstanding rib 79 located adjacent the cord engaging structure 54 and disposed generally centrally on the slide body. The rib includes a ramped leading edge 81 and a stepped trailing edge 82, is dimensioned for receipt in the longitudinal slot 48, and is formed with a longitudinal length shorter than that of the slot to allow for a degree of longitudinal movement of the slide body relative to the cage 12 while simultaneously guiding the slide body so that it moves in a well defined, substantially longitudinal path. The rib and slot are formed at respective selected locations on the slide and cage such that when the rib engages the upper end of the slot, the slide body is in the cord releasing position to permit free movement of the cord segments 34 (FIG. 4).

As shown in FIG. 2, the cord lock apparatus 10 has a relatively low cross-sectional profile and has an unobtrusive configuration. Accordingly, the cord lock apparatus is suitable for many applications that require a cord fastener having such characteristics.

The assembly of the cord lock apparatus 10 will now be described. The slide 14 is initially aligned with the cage 12 so that the ramped leading edge 77 of the stop 76 is located directly in front of the sloped guideway 49. The slide is then forced toward the cage such that the stop is received in the guideway and deflected toward the back wall 24 to pass underneath the guideway and continue on into the slot 48. The spring mechanism 20 is compressed during this step such that the bottom ends of the cord gripping segments 56 and 58 engage the respective shoulders 75 to limit the extent of compression of the spring mechanism. Continued movement of the slide toward the cage causes the sloped leading edge 81 of the rib 79 to engage the guideway. The rib forces the front wall 22 to flex in a direction away from the back wall so that the rib passes thereby. Further movement of the slide into the cage causes the leading edge of the stop to engage the bottom edge of the slot and once again be deflected toward the back wall of the cage and be driven into the notch 46. As the stop is received in the notch, the rib registers with the slot and is received therein. The resilient front wall of the cage then resumes its normal position substantially coplanar with the back wall. The slide includes an outwardly projecting lug 80 formed adjacent the handle 50 for abutting against the first end 30 of the cage to prevent further extension of the slide into the cage. As described above, the rib and stop include the respective stepped trailing edges to positively resist withdrawal of the stop and rib from, respectively, the notch and slot to maintain the slide at least partially contained within the cage. Furthermore, the slot and rib cooperate to limit the extent to which the spring mechanism can be tensioned, such that the spring mechanism can not be stretched beyond its elastic limit.

Accordingly, it will be understood that with the slide 14 and cage 12 assembled together, the slide is free to move relative to the cage from the cord locking position, with the slide driven inwardly as shown in FIG. 5 to lock the cord segments 34 in place, to the intermediate position, with the stepped trailing edge 78 of the stop 76 abutting the inner edge of the notch 46. In the intermediate position, the one end 19 of the slide is prevented from further outward movement. However, the slide body 16 may be displaced further outwardly to the cord releasing position against the bias of the spring mechanism 20 by means of grasping and pulling the handle 50 away from the cage 12 with a force F (FIG. 4), resulting in the spring mechanism being tensioned to urge the slide body inwardly toward the cord locking position (FIG. 4).

With the slide body 16 in the cord releasing position, the cord segment paths 66 and 68 are sufficiently large in cross-section to permit free movement of the cord segments 34 through the cage (FIG. 4). Conversely, when the slide is in the cord locking position, the respective cord segment paths are constricted so that the cord segments are confined in those paths with the teeth 64 of the cord gripping segments 56 and 58 firmly engaging the cord segments to lock those segments in place (FIG. 5). Furthermore, in the intermediate position (FIG. 3), the teeth are in contact with the cord segments but are not firmly engaged with the cord segments to allow the cord segments to travel through the cage. Thus, as the cord segments are displaced inwardly into the cage, the contact of the cord segments and teeth causes the slide to be drawn toward the cord locking position. It will be apparent that this self-locking contact is established, in part, due to the fact that the opposite sides of the open end 30 of the cage force the respective cord segments to change their direction toward the longitudinal axis of the cage and thereby rub against the teeth.

It will also be apparent to those skilled in the art that the ability of the slide 14 to freely move relative to the cage 12 allows the cord lock apparatus 10 to accommodate a wide range of cord segment diameters. Because the slide is free to move within the cage, the cord locking position can vary significantly depending on the size of the cord segments 34, as can the intermediate and cord releasing positions. In addition, by making the slide freely movable, the spring mechanism 20 is unbiased at the cord locking position and thus is not likely to prematurely fail or lose its predictability.

In use, a user may grasp an assembled cord lock apparatus 10 and extend a pair of cord segments 34 from a drawstring or the like through the respective cord segment paths 66 and 68 until the cord segments to the left of the cord lock apparatus reach a desired tautness. Once the cord segments are released, the tension exerted on those cord segments tends to draw the cord segments inwardly through the cage. As the cords are so drawn, the teeth 64 in contact with the cord segments are drawn inwardly as well, causing the slide to be driven inwardly relative to the cage and into the cord locking position (FIG. 5), with the teeth biting into the surfaces of the cord segments and forcing those cord segments tightly against the inner surfaces 38 and 40 to wedge the cord segments therebetween and lock the cord segments with respect to the cord lock apparatus.

If the user desires to loosen the cord, he or she may simply grasp the handle 50 and pull the handle away from the cage 12 with the force F, causing the slide 14 to be driven outwardly relative to the cage (FIG. 4) and resulting in the cord segment paths 66 and 68 being expanded to release the cord segments. The cord segments are then free to move within the cage, and may be drawn inwardly to loosen the cord.

Referring now to FIGS. 8 and 9, there is shown a slide 100 of a cord lock apparatus comprising a second embodiment of the present invention. The slide differs slightly from the slide 14 shown in FIGS. 1 through 7. In particular, the slide includes a cord engaging structure 106 comprising a pair of outwardly projecting cord gripping segments 108 and 110 including teeth 112. However, the cord gripping segments are formed with shorter relative lengths than those 56 and 58 included in the first embodiment to be further spaced from the bottom arm 116 of the spring mechanism 114. In addition, the bottom arm is formed having a shorter transverse length than the bottom arm 19 in the first described embodiment. Because this design permits greater compression of the spring 114 during assembly of the cord lock apparatus, such assembly is preferably performed prior to extending the cord segments through the cage. However, this embodiment is better adapted to pre-load relatively small cord segments. The second embodiment is identical to the first embodiment in all other relevant structural and functional aspects.

Figure 10:
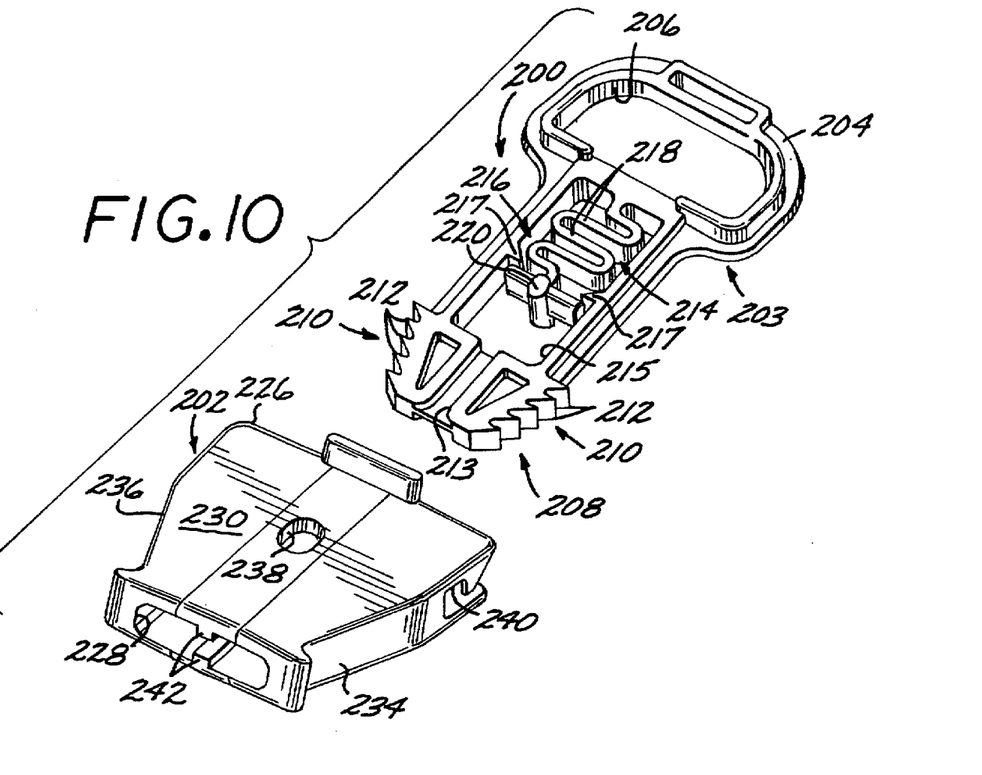
FIG. 10 is an exploded perspective view of an alternative embodiment of the cord lock apparatus of the present invention.
Figure 11:
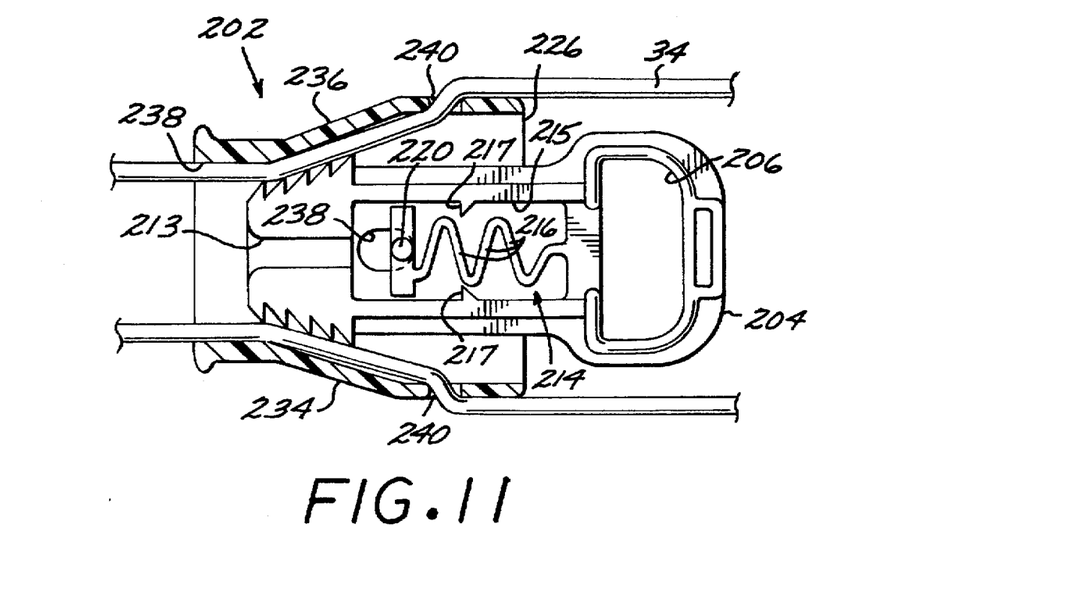
FIG. 11 is a cross-sectional view showing the assembled cord lock apparatus of FIG. 10 in an intermediate position.

Referring to FIGS. 10 and 11, there is shown yet another embodiment of the cord lock apparatus of the present invention, in which the cord lock apparatus includes a slide 200 and a cage 202. The slide comprises a rigid frame defining a slide body 203 and including a generally elliptical ring portion 204 at one end that defines a handle with a central opening 206 sized for receiving a user's fingers to facilitate manipulation of the slide. The slide body is further formed at its opposite end with a cord engaging structure 208, including a pair of laterally outwardly facing cord gripping segments 210, each of which comprises plural teeth 212 for engaging and biting into respective cord segments as described above in connection with the other preferred embodiments. The cord engaging structure further includes a pair of axially extending channels 213 formed on either side of the slide body.

The slide 200 further includes a spring mechanism 214 connected at one end to the handle portion 204 of the slide, the slide mechanism being contained within a generally central cavity 215 defined by the slide body 203. Preferably, the spring mechanism is in the form of a tension spring 216 comprising plural resilient arms 218 connected together in a zig-zag or switchback configuration. The spring mechanism includes a free end configured with an upstanding peg 220, the peg including a ramped leading edge and stepped trailing edge, as described in greater detail below. It will be apparent that the spring may be either expanded or compressed within the cavity 215. A pair of opposing stops 217 project into the cavity and engage the free end of the spring to prevent the spring from being over-compressed during assembly of the slide 200 and cage 202.

Referring to FIG. 10, the cage 202 includes open first and second ends 226 and 228, generally planar front and rear walls 230, and curved side walls 234 and 236. A longitudinal slot 238 is formed in the front wall and is sized to accept the peg 220 (FIG. 11), as described in greater detail below. The rear wall may also be formed with a slot (not shown), such that the front and rear walls may be used interchangeably to engage the peg 220. Preferably, the front and rear walls 230 are each formed with a sloped and narrowing guideway (not shown) to assist in the assembly of the slide 200 and cage 202, as described above in connection with the other embodiments.

Each side wall 234 and 236 is formed with a generally J-shaped keyhole notch 240 extending downwardly from the upper ends of the respective side walls. The keyhole notches are sized for receiving portions of the cord segments during or after the cord segments have been adjusted to a desired degree of tautness. Thus the notches function to prevent a sudden and substantial movement of the cord lock apparatus when it is released, especially in heavy load situations.

The cage 202 further includes a pair of parallel, longitudinally projecting rails 242 formed at predetermined locations on the inside surfaces of the respective front and rear walls 230 (FIG. 10). As the slide 200 and cage are assembled together, the rails are received in the respective channels 213, with the channels and rails cooperating to properly orient the slide 200 with respect to the cage.

Thus, it is apparent that this alternative embodiment eliminates the notch at the bottom of the cage incorporated in the other embodiments disclosed herein. In addition, moving the spring mechanism 214 from the bottom of the slide 200 to a more centralized position allows for the use of a larger and stronger spring and a more rigid cord engaging area, thereby making the cord lock apparatus of the present invention suitable for relatively heavy load conditions.

The use of this embodiment is similar to that of the previously described embodiments. With the slide 200 and cage 202 engaged together, the slide is freely movable between cord locking and intermediate positions, the intermediate position being shown in FIG. 11. As the slide 200 is manually drawn toward a cord releasing position, the peg 220 engages the upper edge of the slot 238. Further extension of the slide from the cage 202 causes the spring 216 to be tensioned, with the cord lock apparatus being drawn to the cord releasing position. When the slide is released, the spring urges the slide back toward a cord locking position, similar to the operation of the previously described embodiments. The stepped edges of the teeth engage the cord segments and, as the cord segments are drawn from the bottom of the cage, the slide is similarly drawn toward the bottom of the cage and into the cord locking position.

Figure 12:
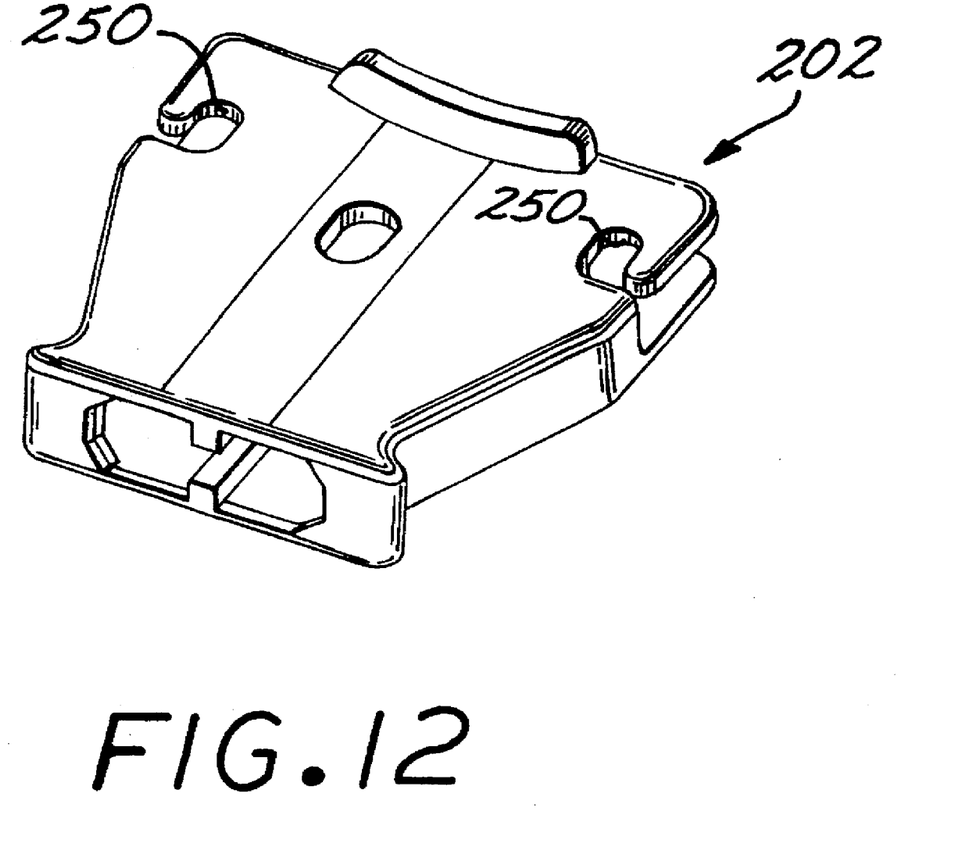
FIG. 12 is a perspective view of an alternative embodiment of the cage component of the cord lock apparatus of FIG. 11.

Referring now to FIG. 12, there is shown an alternative embodiment of the cage 202 of FIG. 11. In this alternative embodiment, the cage is formed with keyhole notches 250 on the front face of the cage to engage and hold the respective cord segments. Preferably, the back face of the cage is also formed with a pair of those notches as well (not shown).

From the foregoing, it will be appreciated that the cord lock apparatus of the present invention provides a reliable, slim profile, easy to use device that enjoys a relatively long useful life by inflicting minimal wear and tear on the cord segments. The provision of the freely movable slide does away with the majority of the forces that would otherwise be exerted on the spring mechanism, and allows the cord locking apparatus to accommodate different sizes of cord segments.

While forms of the invention have been described, it will be apparent to those skilled in the art that various modifications and improvements may be made without departing from the spirit and scope of the invention. As such, it is not intended that the invention be limited, except as by the appended claims.

I claim:

1. Cord lock apparatus for receipt of at least one cord segment and operative to releasably lock said at least one cord segment in place, said cord lock apparatus comprising:

a cage formed with a through passage in which said at least one cord segment may pass;

a slide at least partially contained in said cage and including a slide body displaceable between a cord locking position to prevent relative movement of the cord segment and a cord releasing position to permit such movement, said slide being floatably contained in said cage for free movement between said cord locking position and an intermediate position between said cord releasing and cord locking positions; and said slide further including a spring mechanism to urge the slide body toward the cord locking position when the slide body is in the cord releasing position, whereby with the slide being floatably contained in the cage, the spring mechanism is unstressed when the slide is in the cord engaging position.

2. The cord lock apparatus of claim 1 wherein:

said cage includes an open first end having a first cross-sectional dimension, a tapered intermediate segment, and an open second end having a second cross-sectional dimension smaller than the first cross-sectional dimension; and said slide body comprises a cord engaging structure including a plurality of outwardly projecting serrations to cooperate with the tapered intermediate segment to confine said at least one cord segment therebetween.

3. The cord lock apparatus of claim 1 wherein:

said slide body includes a cord engaging structure adjacent one end of the slide body and a handle at the other end of the slide body.

4. The cord lock apparatus of claim 1 wherein:

said cage includes a front face formed with a longitudinal slot; and said slide body includes a rib for slidable receipt in said slot, said slot and rib cooperating to limit the extent of travel of said slide body relative to said cage.

5. The cord lock apparatus of claim 1 for receipt of a pair of cord segments therein and wherein:

said slide body includes a pair of laterally outwardly extending cord gripping segments including respective serrations for confining the respective cord segments between the respective cord gripping segments and said cage when said slide is moved to said cord locking position.

6. The cord lock apparatus of claim 1 wherein:

said slide further includes travel limiting structure disposed adjacent one end of said slide to resist further movement of said one end toward said cord releasing position when said slide is at the intermediate position; and said spring mechanism is interposed between said one end and the slide body.

7. The cord lock apparatus of claim 6 wherein:

said cage is formed with a notch at a preselected location thereon; and said travel limiting structure comprises a stop received in said notch for travel therein between the respective cord locking and intermediate positions.

8. The cord lock apparatus of claim 1 wherein:

the slide comprises a frame formed with a generally central cavity; and the spring mechanism is contained within the cavity and includes a first end connected to the slide.

9. The cord lock apparatus of claim 1 wherein:

the slide includes a pair of channels adjacent a lower end thereof; and the cage includes a pair of rails formed adjacent a lower end thereof and configured to be received in the respective channels.

10. The cord lock apparatus of claim 1 wherein:

said cage includes respective side walls formed with notches configured to releasably engage the respective cord segments.

11. A cord lock for receipt of at least one cord segment and operative to lock said at least one cord segment in place, said cord lock comprising:

a cage formed with open first and second ends;

a slide at least partially contained in said cage and including a slide body displaceable between cord releasing and cord locking positions, said slide being floatably contained in said cage for free movement between said cord locking position and an intermediate position between said cord releasing and cord locking positions, said slide body being formed with a pair of outwardly facing cord engaging surfaces, each said surface including one or more outwardly projecting serrations to cooperate with the cage to define cord passageways and to constrict said cord segments therebetween when said slide is at the cord locking position;

said slide further including a stop that engages said cage when said slide is at said intermediate position to restrict further movement of said one end toward said cord releasing position; and said slide further including a spring mechanism to urge the slide body toward the cord locking position when the slide body is in the cord releasing position, whereby with the slide being floatably contained in the cage, the spring mechanism is unstressed when the slide is in the cord engaging position.

12. The cord lock of claim 11 wherein:

the slide includes a handle at one end thereof and a cord engaging structure at an opposite end thereof, and wherein the spring mechanism is interposed between the handle and cord engaging structure.

13. The cord lock of claim 11 wherein:

said cage includes a front face formed with a longitudinal slot; and said slide includes an upstanding rib for slidable receipt in said slot, said slot and rib cooperating to limit the extent of travel of said slide relative to said cage.

14. The cord lock of claim 11 wherein:

said cage is formed with a notch at a preselected location thereon; and said stop travels in said notch between the respective cord locking and intermediate positions.

15. The cord lock of claim 11 wherein:

said spring mechanism is formed integral with the slide.

16. Cord lock apparatus for receipt of a pair of cord segments and operative to releasably lock said cord segments in place, said cord lock apparatus comprising:

a cage formed with a through passage in which said cord segments may pass, said cage further including a slot formed therein;

a slide at least partially contained in said cage and including a cord engaging structure disposed adjacent one end of the slide, the cord engaging structure being operative to engage the respective cord segments, said slide being displaceable between a cord locking position to lock the cord segments in place and prevent movement of the cord segments relative to the cage and a cord releasing position to permit such movement, said slide being floatably contained in said cage for free movement between said cord locking position and an intermediate position between said cord releasing and cord locking positions; and said slide defining a generally central cavity and further including a spring connected at a first end to the slide and being contained within the cavity, the spring being operative to bias the slide toward the cord locking position when the slide is in the cord releasing position, whereby with the slide being floatably contained in the cage, the spring mechanism is unstressed when the slide is in the cord engaging position.

17. The cord lock apparatus of claim 16 wherein:

the slide includes a pair of channels adjacent a lower end thereof; and the cage includes a pair of rails formed adjacent a lower end thereof and configured to be received in the respective channels.

18. The cord lock apparatus of claim 16 wherein:

said cage includes an open first end having a first cross-sectional dimension, a tapered intermediate segment, and an open second end having a second cross-sectional dimension smaller than the first cross-sectional dimension; and said cord engaging structure comprises a pair of cord gripping segments, each of which includes a plurality of outwardly projecting serrations to cooperate with the tapered intermediate segment to confine said cord segments therebetween.

19. The cord lock apparatus of claim 16 wherein:

said cage is formed with notches configured to releasably engage the respective cord segments.

20. The cord lock apparatus of claim 16 wherein:

said spring carries an upstanding peg configured to be received in said slot for travel therein between the respective cord locking and intermediate positions.

21. The cord lock apparatus of claim 20 wherein:

the spring comprises a tension spring and includes a first end connected to the slide and a free second end carrying the peg.

22. A cord lock for receipt of at least one cord segment and operative to lock said at least one cord segment in place, said cord lock comprising:

a cage formed with open first and second ends;

a slide at least partially contained in said cage and including a slide body displaceable between cord releasing and cord locking positions, said slide being freely movable relative to said cage between said cord locking position and an intermediate position between said cord releasing and cord locking positions, said slide body being formed with a pair of outwardly facing cord engaging surfaces, each said surface including one or more outwardly projecting serrations to cooperate with the cage to define cord passageways and to constrict said cord segments therebetween when said slide is at the cord locking position;

said slide further including a stop that engages said cage when said slide is at said intermediate position to restrict further movement of said one end toward said cord releasing position; and said slide further including a spring mechanism to urge the slide body toward the cord locking position when the slide body is in the cord releasing position, wherein said slide includes a handle at a first end and a cord engaging structure at a second end, and the spring mechanism is interposed between the handle and cord engaging structure.

23. The cord lock apparatus of claim 22, wherein the slide includes a pair of channels adjacent a lower end thereof, and the cage includes a pair of rails formed adjacent a lower end thereof and configured to be received in the respective channels.

* * * * *